United States Patent
Irvin et al.

(10) Patent No.: US 6,987,975 B1
(45) Date of Patent: Jan. 17, 2006

(54) METHOD OF GENERATING CONTROL SIGNALS BASED ON LOCATION OF RADIO TERMINALS

(75) Inventors: David R. Irvin, Raleigh, NC (US); Ali S. Khayrallah, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/289,067

(22) Filed: Apr. 8, 1999

(51) Int. Cl.
*H04Q 7/20* (2006.01)

(52) U.S. Cl. ............. 455/456.1; 455/41.2; 455/90.2

(58) Field of Classification Search ............. 455/456, 455/457, 458, 414, 435, 410, 456.1, 456.2, 455/456.3, 456.5, 456.6, 414.1, 41.2, 463, 455/404.1, 404.2, 88, 558, 90.2, 90.1
See application file for complete search history.

(56) References Cited

U.S. PATENT DOCUMENTS

| | | | |
|---|---|---|---|
| 5,638,423 A | 6/1997 | Grube et al. | 379/58 |
| 5,666,661 A | 9/1997 | Grube et al. | 455/509 |
| 5,668,875 A * | 9/1997 | Brown et al. | 455/411 |
| 5,689,809 A | 11/1997 | Grube et al. | 455/54.1 |
| 5,790,074 A | 8/1998 | Rangedahl et al. | 342/357 |
| 5,790,952 A * | 8/1998 | Seazholtz et al. | 455/432 |
| 5,835,857 A * | 11/1998 | Otten | 455/410 |
| 5,845,213 A * | 12/1998 | Sumner et al. | 455/458 |
| 5,854,982 A * | 12/1998 | Chambers et al. | 455/445 |
| 6,029,064 A * | 2/2000 | Farris et al. | 455/412.2 |
| 6,151,491 A * | 11/2000 | Farris et al. | 455/412.2 |
| 6,161,006 A * | 12/2000 | Balachandra | 455/410 |
| 6,246,882 B1 * | 6/2001 | Lachance | 455/456 |
| 6,493,550 B1 * | 12/2002 | Raith | 455/422 |
| 6,859,650 B1 * | 2/2005 | Ritter | 455/406 |

FOREIGN PATENT DOCUMENTS

| | | |
|---|---|---|
| WO | 9825433 | 6/1998 |
| WO | WO 99/33199 | 7/1999 |
| WO | WO 99/66757 | 12/1999 |
| WO | 0022860 | 4/2000 |

* cited by examiner

*Primary Examiner*—Edward F. Urban
*Assistant Examiner*—Thuan Nguyen
(74) *Attorney, Agent, or Firm*—Wood, Phillips, Van Santen Clark & Mortimer (57) ABSTRACT

A method of generating a control signal to enable or inhibit a wide variety of applications is provided. The method generally includes the steps of determining the location of a first mobile radio terminal, determining the location of a second mobile radio terminal, comparing the locations of the terminals, and generating a control signal based upon the comparison. The control signal may be generated if the first and second mobile radio terminals are within a specified distance of one another. Alternatively, the control signal may be generated if the first and second mobile radio terminals are separated by at least a specified distance from one another. Additionally, the control signal may be generated if it is determined that the first mobile radio terminal is at a first specified location and the second mobile radio terminal is at a second specified location spacially separated from the first specified location. Further, the control signal may be generated if the first and second mobile radio terminals are at specified locations at a preselect time.

17 Claims, 8 Drawing Sheets

METHOD OF GENERATING CONTROL SIGNALS BASED ON LOCATION OF RADIO TERMINALS

FIELD OF THE INVENTION

The present invention is generally directed toward wireless communications systems and, more particularly, toward the generation of a control signal when two or more radio terminals are at specified locations.

BACKGROUND OF THE INVENTION

U.S. Pat. No. 5,638,423 teaches activating a wireless radio terminal, such as a cellular phone, in response to a signal received from a proximity user card over a short-range RF (Radio Frequency) link. The wireless terminal is activated for use when the wireless terminal and the proximity user card are within a predetermined distance from one another, which aids in preventing unauthorized use of the wireless terminal. The predetermined distance is set by the transceiving range between the proximity user card and the wireless terminal. However, a disadvantage of the method taught by U.S. Pat. No. 5,638,423 is that it depends on signal amplitude of a low power, short-range RF link between the wireless terminal and the proximity user card, which is inherently unreliable.

The wireless terminal transmits an inquiry signal, via the low power, short-range RF link, to the card. If the wireless terminal's inquiry to the card goes unanswered, logic in the wireless terminal determines that the wireless terminal and the card are separated by a distance greater than the predetermined distance, and the wireless terminal transmits an invalid proximity message and is kept locked. Since the range and reliability of a low power, short-range RF link varies according to signal loss imposed by its environment, the method of activating a wireless terminal for use as taught in U.S. Pat. No. 5,638,423 is subject to erroneous determinations.

The disclosed method overcomes one or more of the abovementioned problems.

SUMMARY OF THE INVENTION

A control signal is generated based on the location of one or more mobile radio terminals as determined, for example, by a global positioning system or, where the radio terminal is a cellular terminal, by cellular positioning. The method generally includes the steps of determining the location of a first mobile radio terminal, determining the location of a second mobile radio terminal, comparing the locations of the terminals, and generating a control signal based upon the comparison. The control signal may be generated if the first and second mobile radio terminals are within a specified distance of one another. Alternatively, the control signal may be generated if the first and second mobile radio terminals are separated by at least a specified distance from one another. Additionally, the control signal may be generated if it is determined that the first mobile radio terminal is at a first specified location and the second mobile radio terminal is at a second specified location spacially separated from the first specified location. Still further, the control signal may be generated if it is determined that the first and second mobile radio terminals are at the first and second specified locations at some particular time (or times).

In one form, the first mobile radio terminal is a mobile communication device and the second mobile radio terminal is a key permitting operation of the mobile communication device only when the key is within a predetermined distance from the mobile communication device. If the key is determined to be within the predetermined distance of the mobile communication device, the control signal activates the mobile communication device for use.

An alternative embodiment of the method includes the steps of determining locations of N mobile radio terminals (where $N \geq 2$), comparing the locations of the N mobile radio terminals with M different specified locations, wherein $M \leq N$, and generating a control signal if at least one of the N mobile radio terminals is determined to be located at each of the M different specified locations, or if each of the N terminals is at its assigned specified location.

In one form of the alternative embodiment, the step of determining locations of the N mobile radio terminals includes the step of continuously monitoring, via a central server remote from the N mobile radio terminals, the locations of the N mobile radio terminals.

A further embodiment of the method includes the steps of receiving, at a location server, an initiation signal from a first mobile radio terminal, and transmitting, by the location server, a location query to the first and second mobile radio terminals. In response to the location query, the first and second mobile radio terminals report their respective locations to the location server. The location server compares the received locations of the first and second mobile radio terminals and generates a control signal based upon the comparison.

In one form of the further embodiment, the initiation signal from the first mobile radio terminal includes the location of the first mobile radio terminal, wherein the location server need only transmit a location query to the second mobile radio terminal.

Location information of the first and second mobile radio terminals, or of the N mobile radio terminals, may be provided by a GPS receiver in the mobile radio terminals or, for a cellular terminal, by cellular positioning.

It is an object of the disclosed method to generate a control signal when two or more mobile radio terminals are simultaneously in two or more prearranged positions. The positions may be relative to each other or absolute, and the control signal may be utilized to enable or inhibit a wide variety of applications.

Other aspects, objects and advantages of the disclosed method can be obtained from a study of the application, the drawings, and the appended claims.

DETAILED DESCRIPTION OF THE INVENTION

A control signal is generated when two or more mobile radio terminals are simultaneously in two or more specified locations, and alternatively, when two or more mobile radio terminals are simultaneously in two or more specified locations at some particular time (or times). The control signal may be used to enable or inhibit a wide variety of applications. In one form, each of the wireless terminals is provided with a GPS (Global Positioning System) receiver for determining the location of the terminal. The control signal may be generated by any of the radio terminals, or by a location server remote from the radio terminals and in wireless communication therewith.

In one application, a cellular phone may be paired with a smart card carried by the user of the cellular phone. The cellular phone operates only when it is within a selected specified distance from the smart card. Thus, the smart card serves as a key for activating/unlocking the cellular phone.

Figure 1:
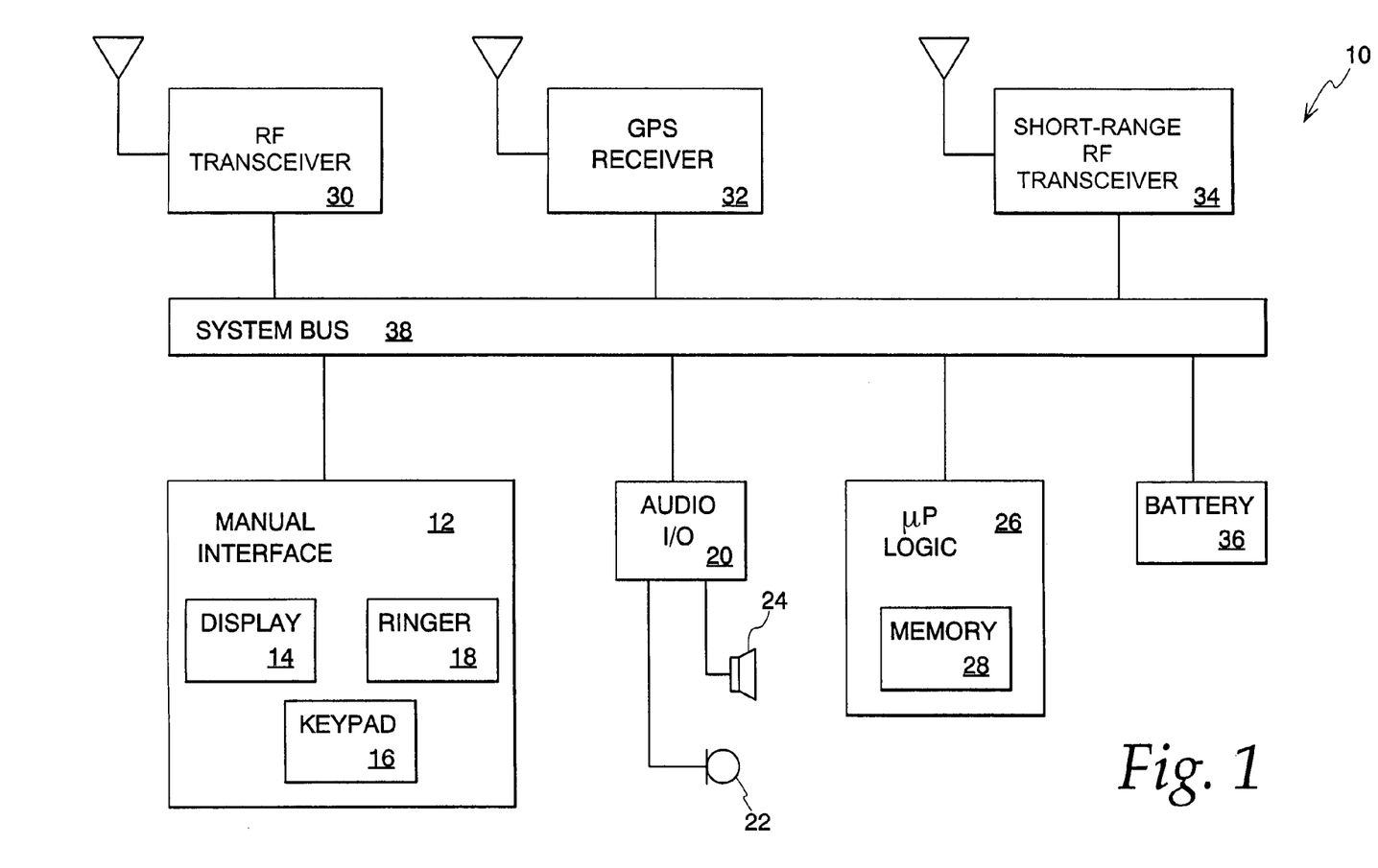
FIG. 1 is a block diagram of a cellular phone used in the generation of a control signal based on location.

FIG. 1 is a block diagram of a cellular phone, shown generally at 10, which includes a user interface 12 having visual display 14, keypad 16 and ringer 18 features, an audio I/O circuit 20 connected to a microphone 22 and a speaker 24, a microprocessor logic circuit 26 having a memory 28, a wide-range RF transceiver 30, a GPS receiver 32 and a short-range RF transceiver 34 all communicating, and receiving power from battery 36, via a system bus 38.

Figure 2:
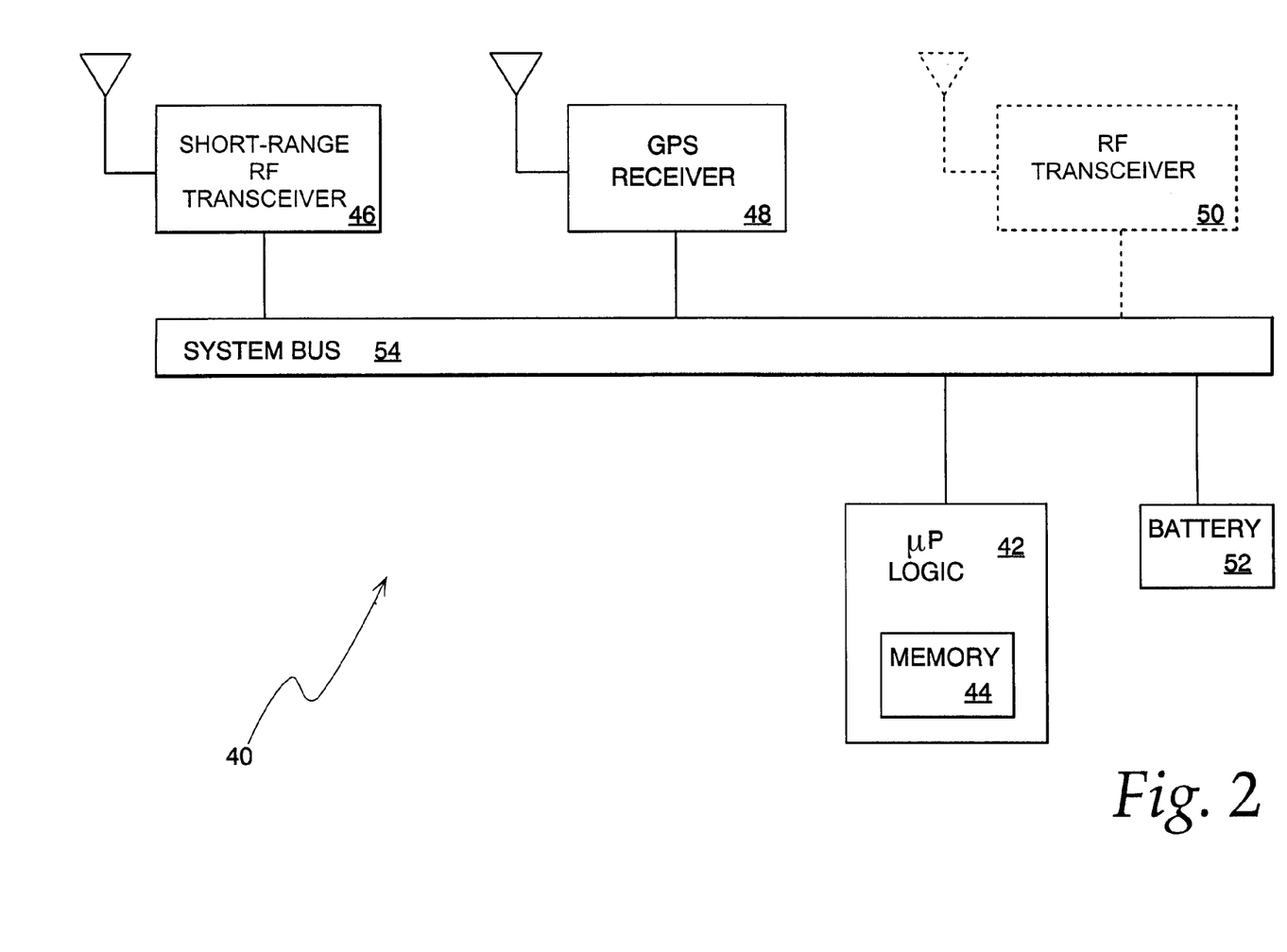
FIG. 2 is a block diagram of a smart card used in the generation of a control signal based on location.

FIG. 2 is a block diagram of a smart card, shown generally at 40, which includes a microprocessor logic circuit 42 having a memory 44, a short-range RF transceiver 46, a GPS receiver 48, and optionally a wide-range RF transceiver 50 all communicating, and receiving power from battery 52, via a system bus 54.

The GPS receivers 32 and 48 in the phone 10 and smart card 40 preferably turn on intermittently to detect the location of the respective terminal. The location of the phone 10 is stored in its memory 28, and similarly, the location of the smart card 40 is stored in its memory 44.

Operation when a user desires to activate the phone 10 for use will now be described with respect to FIGS. 1–2 and the flow chart of FIG. 3. It should be understood that while operation will be described with specific reference to the phone 10 and smart card 40, the phone 10 and smart card 40 may be any wireless radio terminals.

Upon call activity, either incoming or outgoing, at the phone 10 at block 54, the microprocessor logic circuit 26 in the phone 10 queries the phone's 10 location at block 56. The microprocessor logic circuit 26, at block 56, may retrieve the last stored location of the phone 10 from the memory 28, or may activate the GPS receiver 32 to do a location check. The phone's microprocessor logic circuit 26 then queries the card's 40 location at block 58. Similarly, the card 40 may respond with the last location stored in its memory 44, or may activate its GPS receiver 48 to do a location check and respond with the determined location. The query from the phone 10, at block 58, and response from the card 40 are transmitted over a short-range RF link, for example, Bluetooth as described in "Bluetooth—The universal radio interface for ad hoc, wireless connectivity" Ericsson Review No. 3, 1998, established by short-range RF transceivers 34 and 46 in the phone 10 and card 40, respectively.

If a timely response is received from the card 40 at block 60, the microprocessor logic circuit 26 in the phone 10 compares the locations of the phone 10 and card 40 at block 62. If it is determined that the locations are within a specified range at block 64, the microprocessor logic circuit 26 in the phone 10 generates a control signal at block 66, to activate the phone 10 and allow the call to be processed. If the locations are not within a specified range or distance at block 64, the microprocessor logic circuit 26 in the phone 10 keeps the phone 10 locked or deactivated at block 68. If a timely response is not received from the card 40 at block 60, the microprocessor logic circuit 26 in the phone 10 keeps the phone 10 locked or deactivated at block 70. It should be understood that the decision to lock or unlock the phone 10 may also be made in the smart card 40. In this variation, the smart card 40 would send an authorization sequence to the phone 10, at block 66, over the short-range RF link to unlock or activate the phone 10.

Figure 3:
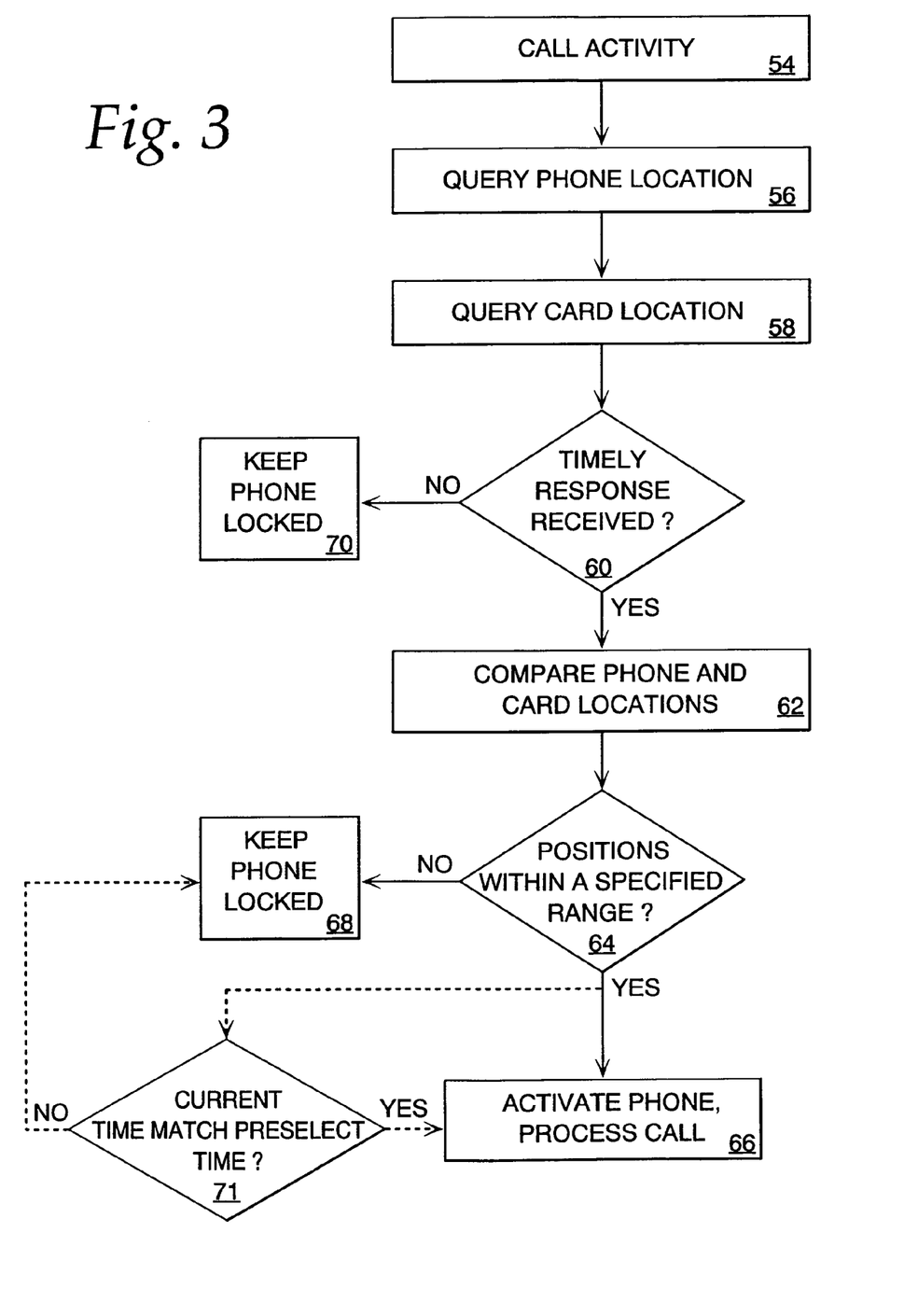
FIG. 3 is a flow chart illustrating the generation of a control signal based on the location of a cellular phone and a smart card.

In an alternative form, as shown in dotted lines in FIG. 3, after the positions of the phone 10 and card 40 are determined to be within a specified range at block 64, the current time, generally kept by a clock (not shown) internal to either the phone 10 and card 40 is compared with a preselect time, at block 71. The preselect time, set by a user, may be a particular point in time or a time range, e.g., 1:00 PM–4:00 PM. If the current time matches the preselect time at block 71, the control signal is generated at block 66 to activate the phone 10 and allow the call to be processed. If the current time does not match the preselect time, the phone 10 is kept locked or deactivated at block 68. By adding the time constraint, a user, such as a parent, is able to restrict use of the phone 10, such as by their children to whom the phone 10 may be given, to certain times of the day.

Figure 4:
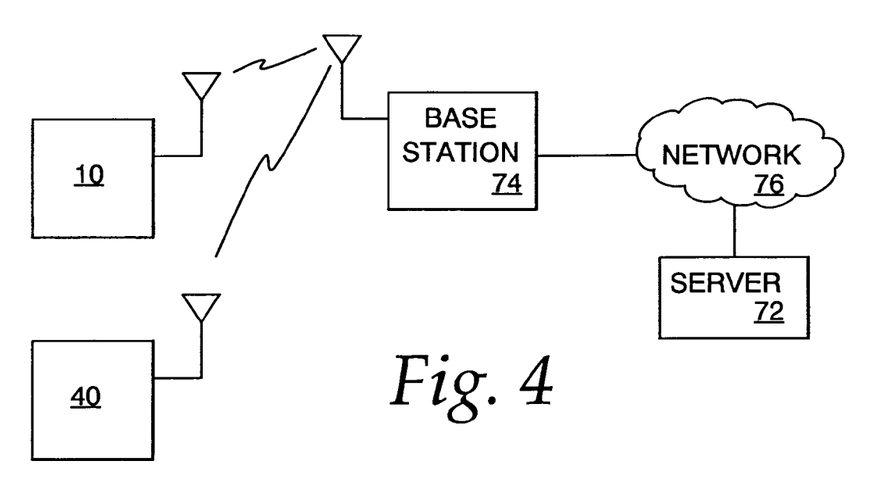
FIG. 4 is a block diagram of a wireless communications system used in the generation of a control signal based on location.

The determination of whether the phone 10 and card 40 are within a specified range may be made by a location server 72 remote from the phone 10 and card 40, as shown in FIG. 4. The location server 72 communicates with the phone 10 and card 40 via base station 74 and network 76, or may be physically located at the base station 74. The network 76 may be any type of network permitting voice or data communication between the base station 74 and location server 72, such as, but not limited to, a PSTN (Public Switching Telephone Network), the Internet, etc. Communication between the phone 10/card 40 and the base station 74 occurs over the wide-range RF link established by the RF transceivers 30 and 50 in the phone 10 and card 40, respectively, and an RF transceiver (not shown) in the base station 74. To support such wide-range communications, the phone 10 and card 40 each have a Mobile Identification Number (MIN) or Short-Message-Service (SMS) capability.

Figure 5:
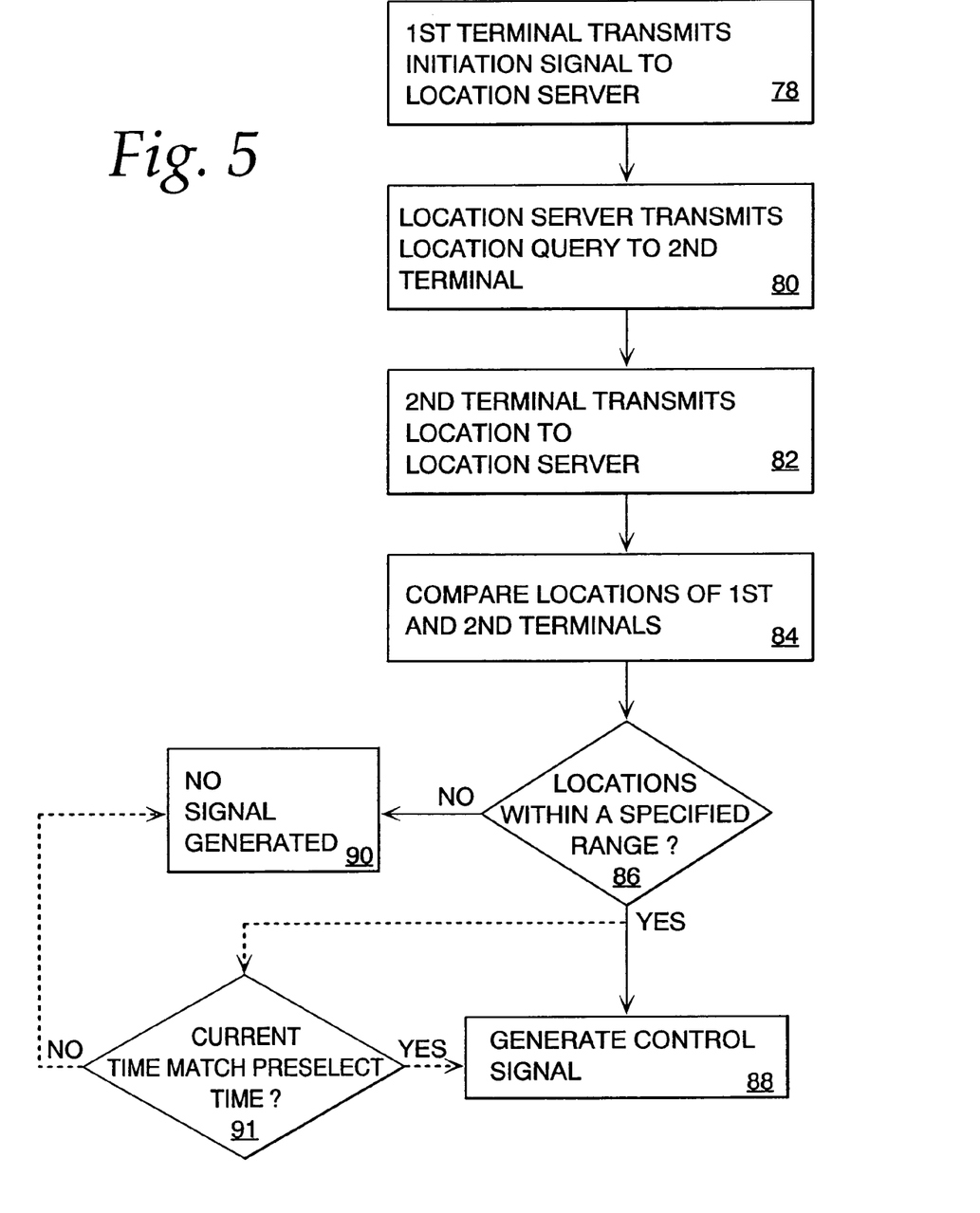
FIG. 5 is a flow chart illustrating the generation of a control signal based on the location of first and second mobile radio terminals.

In operation, as shown in FIGS. 1–2, 4 and the flow chart of FIG. 5, the phone 10 (1st terminal) transmits an initiation signal, such as an activation request signal or call set up signal, to the location server 72 via the base station 74 and network 76 at block 78. For convenience, communication will generally be described as taking place between the phone 10/card 40 and the location server 72, however, it should be understood that all such communications occur via the base station 74 and network 76 (if the location server 72 is not at the base station 74). The initiation signal transmitted by the phone 10 at block 78, also includes data representing the location of the phone 10, which may be obtained by utilizing the last location stored in the phone's memory 28 or activating the phone's GPS receiver 32 to do a location check. Upon receipt of the initiation signal from the phone 10, the location server 72 transmits a location query to the card 40 (2nd terminal) at block 80. The card 40 receives the location query and transmits its location back to the location server 72 at block 82. The location of the card 40 may be obtained by either retrieving the last stored location of the card 40 from its memory 44 or activating the card's GPS receiver 48 to do a location check upon receipt of the location query from the location server 72. The location server 72 compares the received locations of the phone 10 and card 40 at block 84. If the server 72 determines that the locations of the phone 10 and card 40 are within a specified range, at block 86, the location server 72 generates a control signal at block 88, typically to activate the phone 10 allowing it to process the call. If the location server 72 determines that the locations of the phone 10 and card 40 are not within a specified range at block 86, the location server 72 does not generate a control signal, at block 90, keeping the phone 10 locked/deactivated.

In an alternative form, as shown in dotted lines in FIG. 5, after the locations of the phone 10 and card 40 are determined to be within a specified range at block 86, the location server 72 determines whether the current time, generally kept by a clock (not shown) internal to the location server 72, matches a preselect time at block 91. The preselect time, set by a user of the system, may be a particular point in time or a time range, e.g., 1:00 PM–7:00 PM. If the current time matches the preselect time at block 91, the location server 72 generates a control signal at block 88. Otherwise, the location server 72 does not generate a control signal, at block 90.

Figure 6:
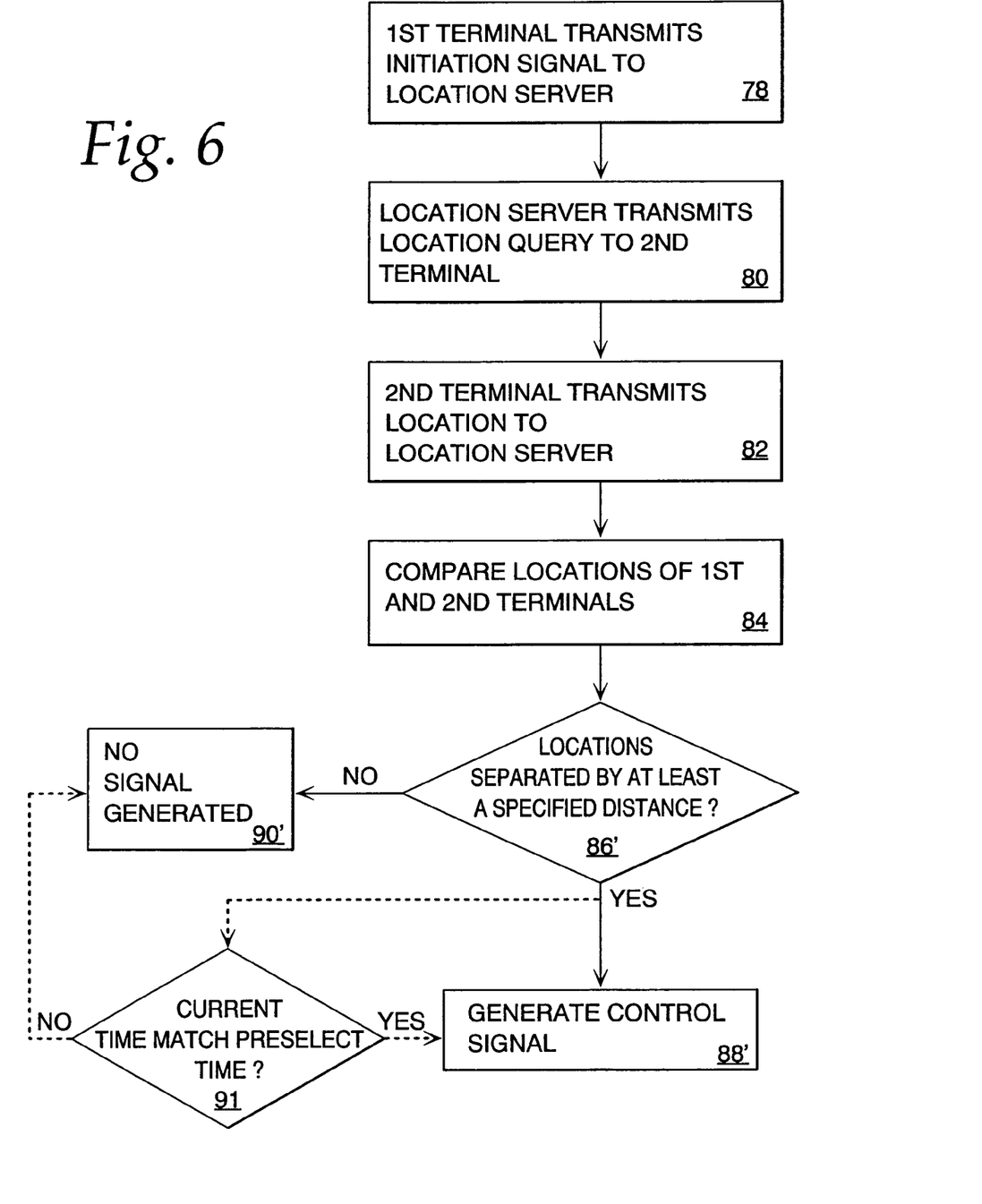
FIG. 6 is a flow chart illustrating an alternative form of generating a control signal based on the location of first and second mobile radio terminals.

In an alternative embodiment, as shown in FIG. 6, blocks 86, 88 and 90 have been replaced with blocks 86', 88' and 90'. The steps provided in blocks 78, 80, 82 and 84, and alternatively block 91, are performed in the same manner as previously described with respect to FIG. 5. After comparing the locations of the phone 10 and card 40 at block 84, the location server 72 determines whether the locations of the phone 10 and card 40 are separated by a predetermined distance at block 86'. If the location server 72 determines that the locations of the phone 10 and card 40 are separated by at least the specified distance at block 86', the location server 72 generates a control signal at block 88'. If, however, the locations of the phone 10 and card 40 are not separated by the specified distance, no control signal is generated by the location server 72 at block 90'.

Figure 7:
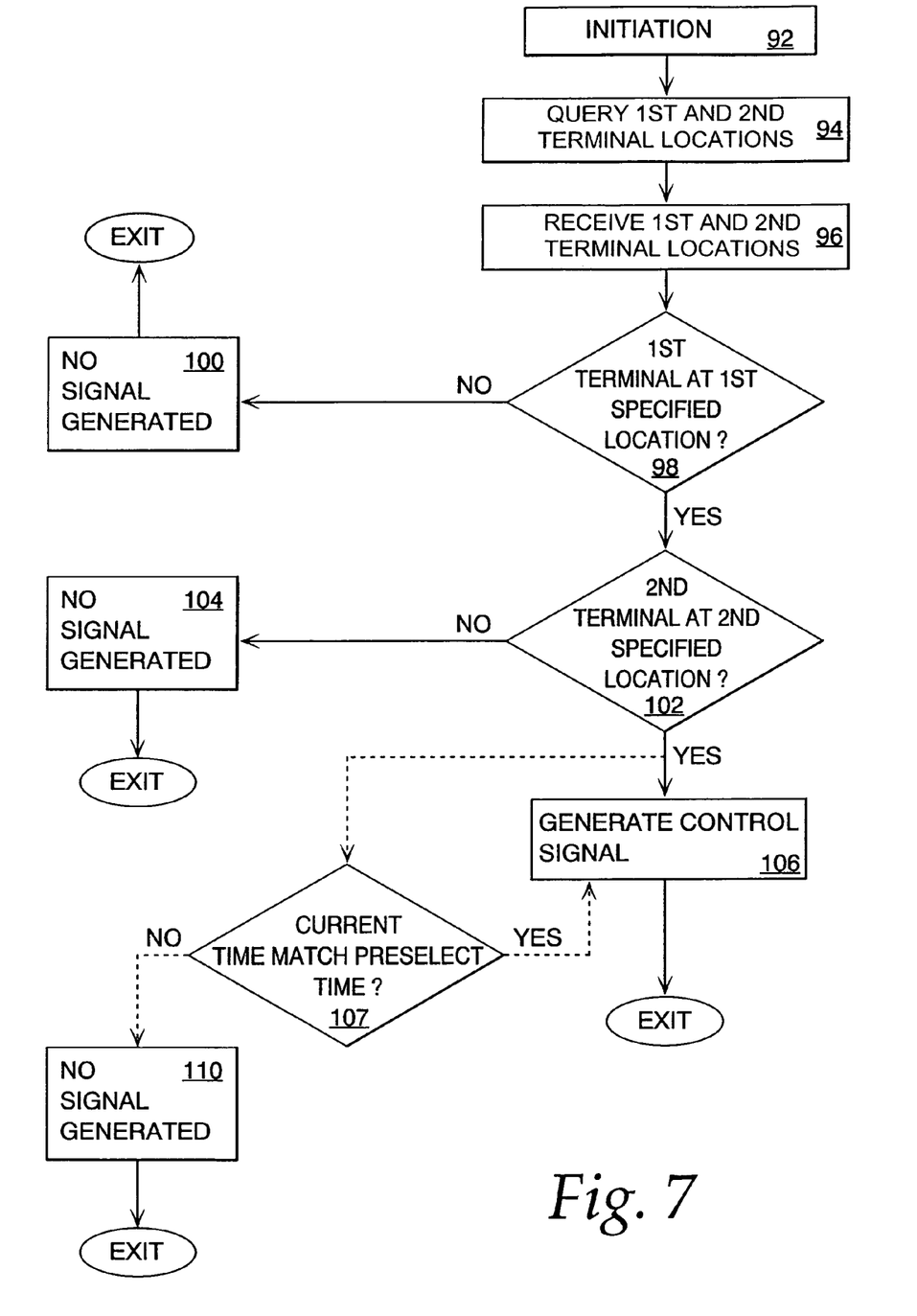
FIG. 7 is a flow chart illustrating a further form of generating a control signal based on the location of first and second mobile radio terminals.

Alternatively, generation of the control signal may occur according to the routine illustrated in FIG. 7. After initiation at block 92 by either the phone 10 or card 40, the location server 72 queries, at block 94, and receives, at block 96, the locations of the phone 10 (1st terminal) and card 40 (2nd terminal). The location server 72 then determines, at block 98, whether the phone 10 is at a first specified location. If not, the location server 72 does not generate a control signal, at block 100, and exits the routine. If the phone 10 is at the first specified location, the location server 72 then determines whether the card 40 is at a second specified location at block 102. If not, the location server 72 does not generate a control signal, at block 104, and exits the routine. If the card 40 is determined to be at the second specified location, the location server 72 generates a control signal at block 106 and exits the routine. As previously noted, the control signal may be used to enable or inhibit a variety of applications.

In a further form, as shown in dotted lines in FIG. 7, after the location of the card 40 is determined to be at the second specified location at block 102, the location server 72 determines whether the current time, generally kept by a clock (not shown) internal to the location server 72, matches a preselect time at block 107. If the current time matches the preselect time at block 107, the location server generates a control signal at block 106 and exits the routine. Otherwise, the location server 72 does not generate a control signal, at block 110, and exits the routine.

Figure 8:
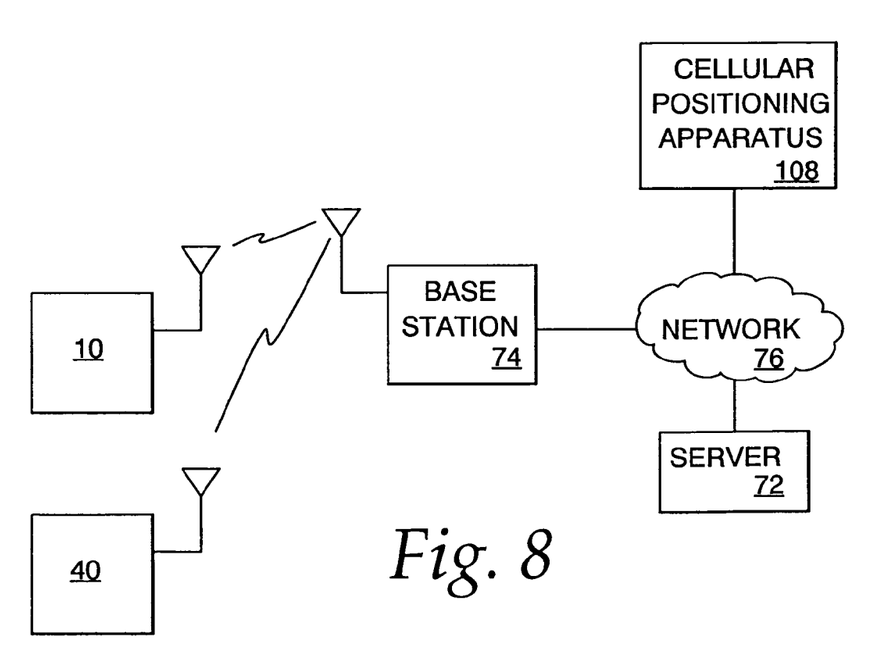
FIG. 8 is a block diagram of an alternative form of the wireless communications system shown in FIG. 4.

Instead of the location server 72 requesting location information from each of the phone 10 and card 40, location information may be supplied to the location server 72 by a cellular positioning system 108, which monitors the location of each of the radio terminals (phone 10 and card 40), as shown in FIG. 8, thus alleviating the need for GPS receivers 32 and 48 in the phone 10 and card 40, respectively. This requires, however, that each of the mobile terminals be actively transmitting signals via their RF transceivers so that their location may be monitored by the cellular positioning system 108. The phone signal utilized by the cellular positioning system 108 may be a communication signal or a registration signal intermittently transmitted by the cell phone 10/card 40. The determined location may be stored in a memory (not shown) resident within the cellular positioning system 108.

In each of the above-described methods utilizing the location server 72, the steps would essentially be the same except that the location server 72 would query the cellular positioning system 108 for the location of the respective radio terminals (phone 10 and card 40). Upon receipt of a location query from the location server 72, the cellular positioning system 108 may used the stored location of the respective radio terminal, if applicable, or may request that the radio terminal transmit a registration signal from which the cellular positioning system 108 may determine its location. Accordingly, a detailed discussion of each method utilizing the cellular positioning system 108 is not necessary.

While the control signal has been described as being generated by the location server 72, it should be understood that either the location server 72 or any of the radio terminals may generate the control signal. Upon determining that the criteria for the generation of the control signal have been met, the location server 72 would transmit an authorization sequence to the respective radio terminal initiating the generation of the control signal by the respective radio terminal.

Figure 9:
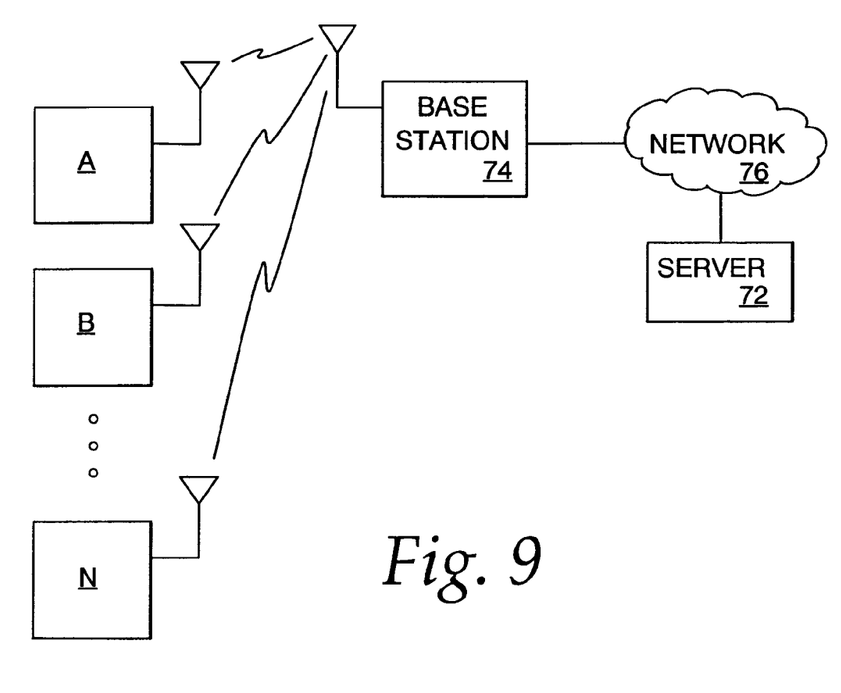
FIG. 9 is a block diagram of a wireless communications system used in the generation of a control signal based on the location of N mobile radio terminals.

The location server 72 may monitor, via base station 74 and network 76 (if the location server 72 is not at the base station 74), the location of a plurality of mobile radio terminals A–N, as shown in FIG. 9. The location server 72 determines if the N different mobile radio terminals, where $N \geq 2$, are at M different locations, where $M \leq N$. The location server 72 determines whether terminals are at the M different locations, and generates an appropriate control signal. Alternatively, the location server 72 may generate the control signal when the N mobile terminals are not at the M different locations.

For example, a secure building may have M guard points. Each of N guards carries a radio terminal which generates a location signal monitored by the location server 72. The location server 72 generates a control signal automatically sealing the building when no guard is at one or more stations, and unlocking the building when all guards are present at their stations.

Figure 10:
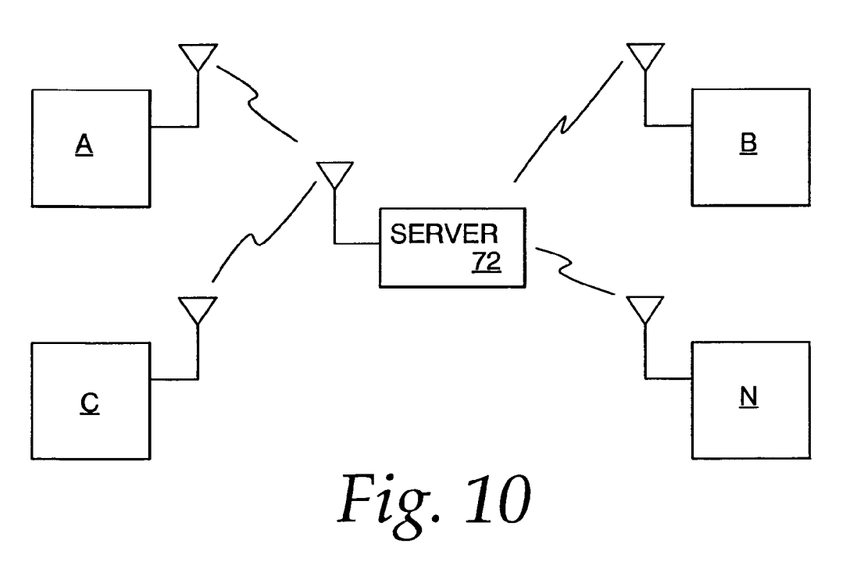
FIG. 10 is a block diagram of an alternative wireless communications system used in the generation of a control signal based on the location of N mobile radio terminals.

As shown in FIG. 10, the mobile radio terminals A–N may communicate directly with the location server 72 if the location server 72 includes a transceiver and is positioned within a sufficient operating range to receive the signals generated by the wireless mobile terminals A–N. In this embodiment, a short-range RF link may be established between the mobile radio terminals A–N and the location server 72. In the above example, this may be the case if the location server 72 was centrally located within the building.

In other applications utilizing the above-described methods, the operation of a marine or maritime phone may be tied to a particular boat having a built-in smart card; the operation of an emergency transceiver may be limited to the area surrounding a police car; the operation of a police car or delivery vehicle may be disabled when an officer or delivery person carries a transceiver away from the car or vehicle; etc. In each application, the mobile radio terminals may exchange position information with each other via a short-range RF link, e.g., Bluetooth, or by each having a Mobile Identification Number (MIN), or Short-Message-Service (SMS) capabilities and access to a location server, or directly to each other, via a wide-range RF link.

While the present invention has been described with particular reference to the drawings, it should be understood that various modifications could be made without departing from the spirit and scope of the present invention.

What is claimed is:

1. A method of generating a control signal comprising:
    determining the location of a first mobile radio terminal, wherein the first mobile radio terminal has been deactivated;
    determining the location of a second mobile radio terminal, wherein the second mobile radio terminal comprises a smart card that serves as a key to activate the first mobile radio terminal;
    comparing the locations of the first mobile radio terminal and the second mobile radio terminal; and
    generating a control signal in response to comparing the locations of the first mobile radio terminal and the second mobile radio terminal, wherein the control signal activates the first mobile radio terminal if the locations of the first mobile radio terminal and the second mobile radio terminal are within a specified distance.

2. The method of claim 1 wherein at least one of determining the location of a first mobile radio terminal, determining the location of a second mobile radio terminal, comparing the locations of the first mobile radio terminal and the second mobile radio terminal, and generating a control signal in response to comparing the locations of the first mobile radio terminal and the second mobile radio terminal is performed by the first mobile radio terminal.

3. The method of claim 1 wherein determining the location of a first mobile radio terminal and determining the location of a second mobile radio terminal is performed by using at least one of a global positioning system and a cellular positioning system.

4. The method of claim 1 further comprising comparing a current time with a preselect time, and wherein generating a control signal further comprises generating said control signal if the locations of the first mobile radio terminal and the second mobile radio terminal are within a specified distance and the current time matches the preselect time.

5. The method of claim 1 wherein at least one of determining the location of a first mobile radio terminal, determining the location of a second mobile radio terminal, comparing the locations of the first mobile radio terminal and the second mobile radio terminal, and generating a control signal in response to comparing the locations of the first mobile radio terminal and the second mobile radio terminal is performed by the second mobile radio terminal.

6. The method of claim 1 wherein at least one of determining the location of a first mobile radio terminal, determining the location of a second mobile radio terminal, comparing the locations of the first mobile radio terminal and the second mobile radio terminal, and generating a control signal in response to comparing the locations of the first mobile radio terminal and the second mobile radio terminal is performed by a location server.

7. A second mobile radio terminal comprising:
    an RF transceiver; and
    a microprocessor logic circuit operable to control the operation of the second mobile radio terminal, said microprocessor logic circuit programmed to substantially perform the following instructions:
        determine the location of a first mobile radio terminal, wherein the first mobile radio terminal has been deactivated;
        determine the location of the second mobile radio terminal, wherein the second mobile radio terminal comprises a smart card that serves as a key to activate the first mobile radio terminal;
        compare the locations of the first mobile radio terminal and the second mobile radio terminal; and
        generate a control signal in response to the compared locations of the first mobile radio terminal and the second mobile radio terminal, wherein said second mobile radio terminal transmits an activation signal in response to said control signal to said first mobile radio terminal to activate the first mobile radio terminal if the locations of the first mobile radio terminal and the second mobile radio terminal are within a specified distance.

8. The second mobile radio terminal of claim 7 wherein said microprocessor logic circuit is programmed to perform all of said instructions.

9. The second mobile radio terminal of claim 7 wherein the microprocessor logic circuit is further programmed to compare a current time with a preselect time.

10. The second mobile radio terminal of claim 7 wherein the activation signal is transmitted by the second mobile radio terminal to the first mobile radio terminal using a short-range radio frequency link.

11. The second mobile radio terminal of claim 10 wherein the short-range radio frequency link comprises a Bluetooth link.

12. The second mobile radio terminal of claim 7 wherein the second mobile radio terminal comprises one of a mobile phone and a smart card.

13. The second mobile radio terminal of claim 7 wherein the second mobile radio terminal comprises a locating device.

14. The second mobile radio terminal of claim 13 wherein the locating device comprises a global positioning system receiver.

15. Apparatus for generating a control signal comprising:
    means for determining the location of a mobile radio terminal, wherein the mobile radio terminal has been deactivated;
    means for determining the location of the apparatus, wherein the apparatus comprises a smart card that serves as a key to activate the mobile radio terminal;

means for comparing the locations of the mobile radio terminal and the apparatus; and means for generating a control signal in response to comparing the locations of the mobile radio terminal and the apparatus, wherein the control signal activates the mobile radio terminal if the locations of the mobile radio terminal and the apparatus are within a specified distance.

16. The apparatus of claim 15 wherein the means for determining the location of a mobile radio terminal and the means for determining the location of the apparatus further comprise means for utilizing at least one of a global positioning system and a cellular positioning system.

17. The apparatus of claim 15 further comprising means for comparing a current time with a preselect time, and wherein the means for generating a control signal further comprise means for generating said control signal if the locations of the mobile radio terminal and the apparatus are within a specified distance and the current time matches the preselect time.

* * * * *